(12) United States Patent
Takeuchi et al.

(10) Patent No.: US 11,389,948 B2
(45) Date of Patent: Jul. 19, 2022

(54) TEACHING METHOD

(71) Applicant: Seiko Epson Corporation, Tokyo (JP)

(72) Inventors: Kaoru Takeuchi, Azumino (JP); Hiroki Adachi, Matsumoto (JP)

(73) Assignee: Seiko Epson Corporation

( * ) Notice: Subject to any disclaimer, the term of this patent is extended or adjusted under 35 U.S.C. 154(b) by 102 days.

(21) Appl. No.: 17/066,591

(22) Filed: Oct. 9, 2020

(65) Prior Publication Data

US 2021/0107135 A1   Apr. 15, 2021

(30) Foreign Application Priority Data

Oct. 11, 2019 (JP) .............................. JP2019-188005

(51) Int. Cl.
  *B25J 9/16* (2006.01)
  *B25J 9/00* (2006.01)
  *B25J 13/08* (2006.01)
  *G05B 19/423* (2006.01)

(52) U.S. Cl.
  CPC .......... *B25J 9/0081* (2013.01); *B25J 9/1643* (2013.01); *B25J 9/1664* (2013.01); *B25J 13/085* (2013.01); *B25J 13/088* (2013.01); *G05B 19/423* (2013.01); *G05B 2219/36401* (2013.01); *G05B 2219/39529* (2013.01); *G05B 2219/40354* (2013.01)

(58) Field of Classification Search
  CPC ...... B25J 9/0081; B25J 9/1643; B25J 9/1664; B25J 13/085; B25J 13/088; G05B 19/423; G05B 2219/36401; G05B 2219/39529; G05B 2219/40354
  See application file for complete search history.

(56) References Cited

U.S. PATENT DOCUMENTS

| 2015/0290798 A1* | 10/2015 | Iwatake | ................. B25J 13/085 700/257 |
| 2018/0210434 A1* | 7/2018 | Iwatake | ................. B25J 9/0081 |
| 2020/0101592 A1* | 4/2020 | Sato | ....................... B25J 9/1666 |
| 2020/0353619 A1* | 11/2020 | Sato | ...................... G05B 19/423 |

FOREIGN PATENT DOCUMENTS

| JP | 2009134352 A | * | 6/2009 | ............ B25J 9/1664 |
| JP | 2015-202536 A | | 11/2015 | |

* cited by examiner

*Primary Examiner* — Dale Moyer
(74) *Attorney, Agent, or Firm* — Harness, Dickey & Pierce, P.L.C.

(57) ABSTRACT

A teaching method of driving a robot arm by a drive unit based on a detection result of a force detection unit and storing a position and a posture of the driven robot arm in a memory unit, includes determining whether or not the posture of the robot arm is close to a singular posture, and, when determining that the posture of the robot arm is close to the singular posture, selecting and executing one escape posture from a plurality of escape posture candidates escaping from the posture close to the singular posture according to an external force detected by the force detection unit.

6 Claims, 14 Drawing Sheets

TEACHING METHOD

The present application is based on, and claims priority from JP Application Serial Number 2019-188005, filed Oct. 11, 2019, the disclosure of which is hereby incorporated by reference herein in its entirety.

BACKGROUND

1. Technical Field

The present disclosure relates to a teaching method.

2. Related Art

Recently, in factories, due to labor cost rise and labor shortage, work manually performed in the past has been increasingly automated by various robots and robot peripherals. The various robots include e.g. bases, arms supported by the bases, and force measuring units as shown in JP-A-2015-202536. In the robot, operation of the arm is controlled based on the detection result of the force measuring unit.

In the robot, prior to work, teaching of storing the position and the posture of the robot arm in the work is performed. As the teaching, as shown in JP-A-2015-202536, direct teaching by an operator moving the robot arm by applying a force thereto and storing the position and the posture in the movement is known.

Further, in the robot, there is a singular posture. The singular posture refers to a posture in which it is impossible to uniquely specify the postures of the respective arms based on coordinates of the control point as reference of control or a posture in which there is a direction in which it is impossible to change the position and the posture of the control point.

In the direct teaching, when the posture of the robot is close to the singular posture, it is hard to change the posture and there is an arm moving at a higher speed, and the motion tends to be unstable. In JP-A-2015-202536, when the posture of the robot is close to the singular posture in the direct teaching, force control in a different mode is performed and the above described failure is reduced.

However, in JP-A-2015-202536, in the posture close to the singular posture, it is necessary for the operator to perform operation of directly applying a force to the arm for moving the arm. Skill is required for properly performing the operation, and teaching in the posture close to the singular posture is difficult in the configuration as disclosed in JP-A-2015-202536.

SUMMARY

The present disclosure has been achieved to solve at least a part of the above described problem and can be implemented as follows.

A teaching method according to the present disclosure is a teaching method for a robot system including a robot arm having at least one rotatable arm, a drive unit that drives the robot arm, a force detection unit that detects an external force applied to the robot arm, and a memory unit that stores a position and a posture of the robot arm, of driving the robot arm by the drive unit based on a detection result of the force detection unit and storing the position and the posture of the driven robot arm in the memory unit, the teaching method including determining whether or not the posture of the robot arm is close to a singular posture, and, when determining that the posture of the robot arm is close to the singular posture, selecting and executing one escape posture from a plurality of escape posture candidates escaping from the posture close to the singular posture according to the external force detected by the force detection unit.

DESCRIPTION OF EXEMPLARY EMBODIMENTS

As below, a teaching method according to the present disclosure will be explained in detail based on preferred embodiments shown in the accompanying drawings.

First Embodiment

Figure 1:
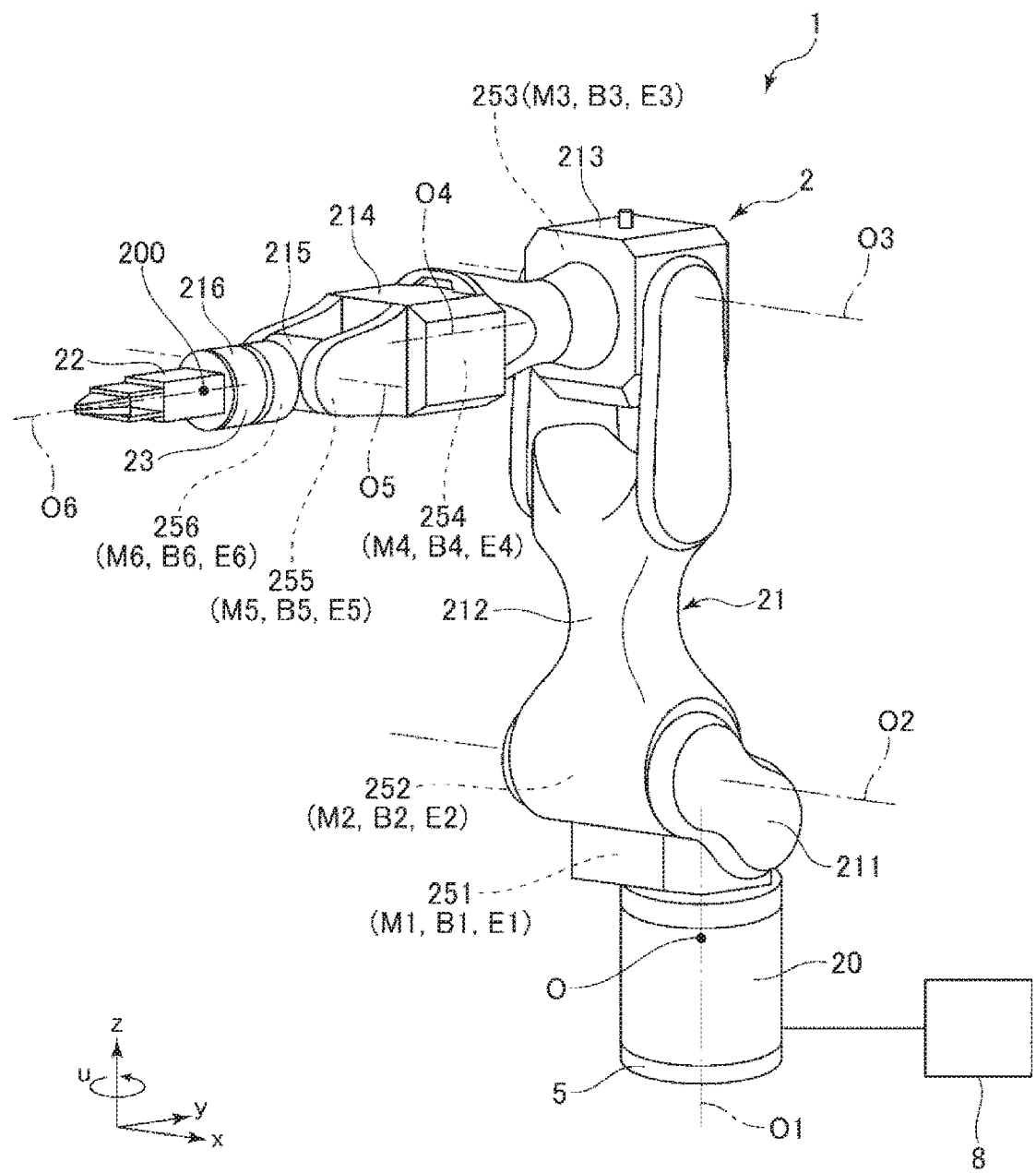
FIG. 1 is an overall view showing a robot system that executes a teaching method according to the present disclosure.
Figure 2:
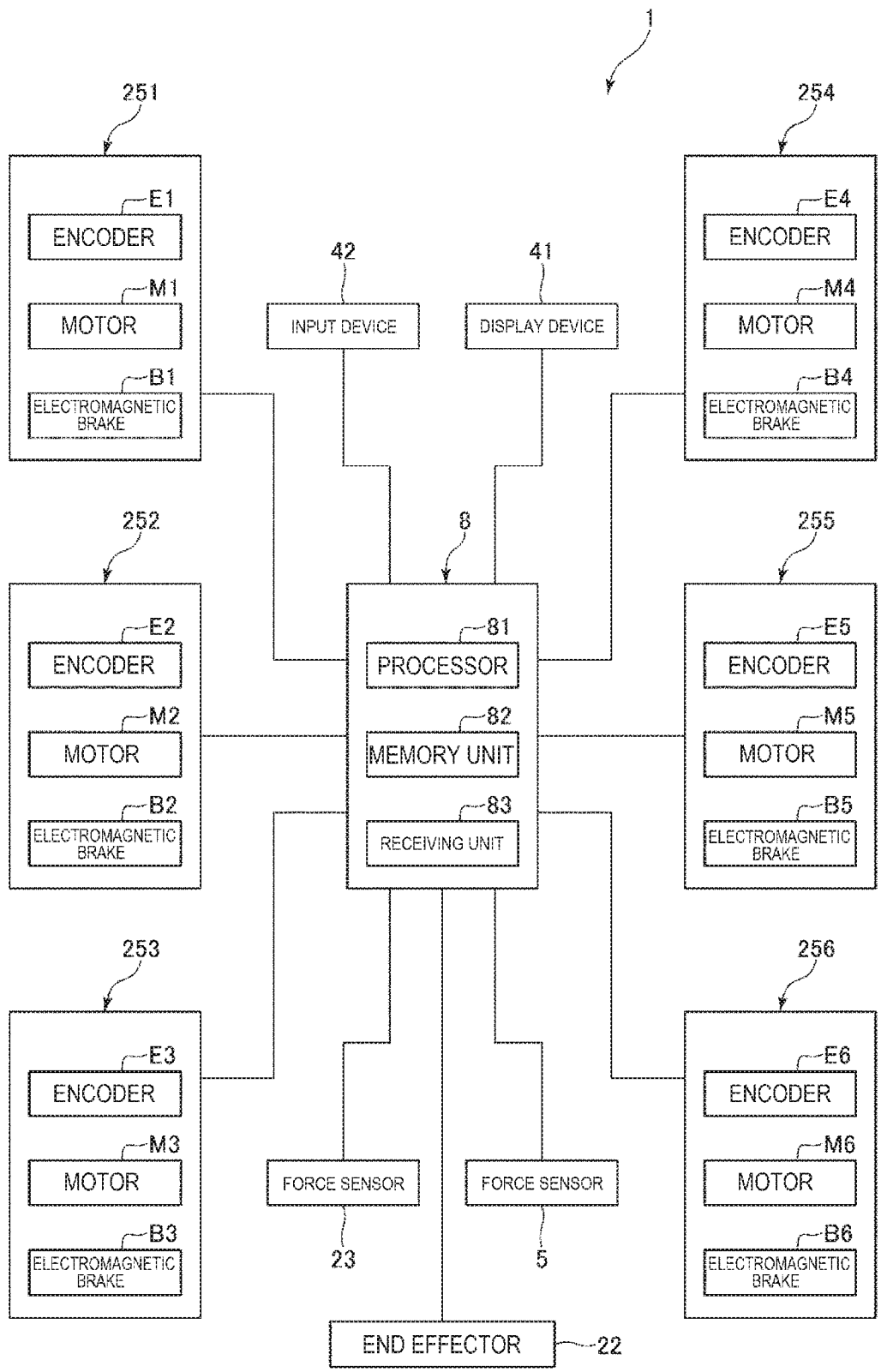
FIG. 2 is a block diagram of the robot system shown in FIG. 1.
Figure 3:
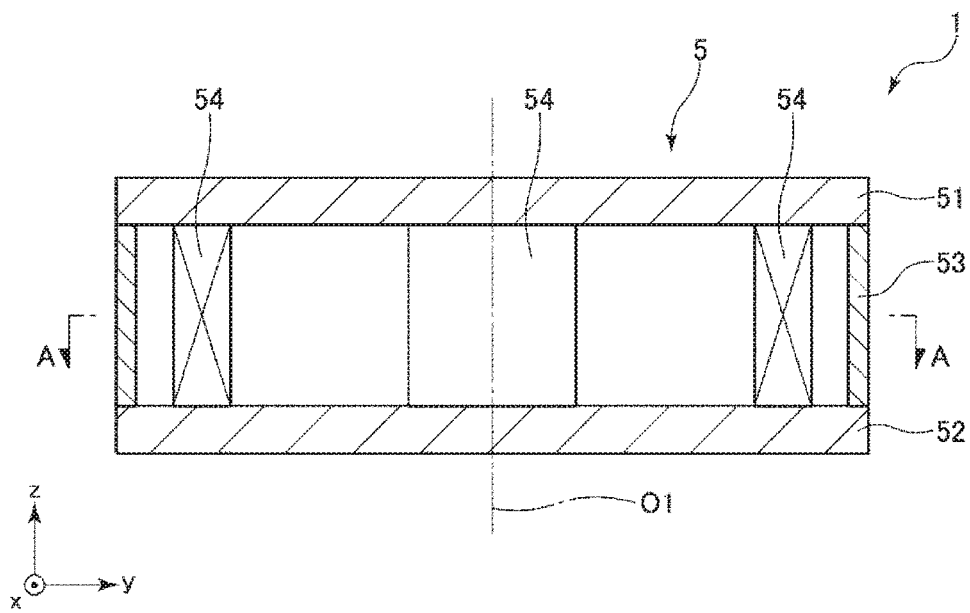
FIG. 3 is a longitudinal sectional view of a force detection unit of the robot system shown in FIG. 1.
Figure 4:
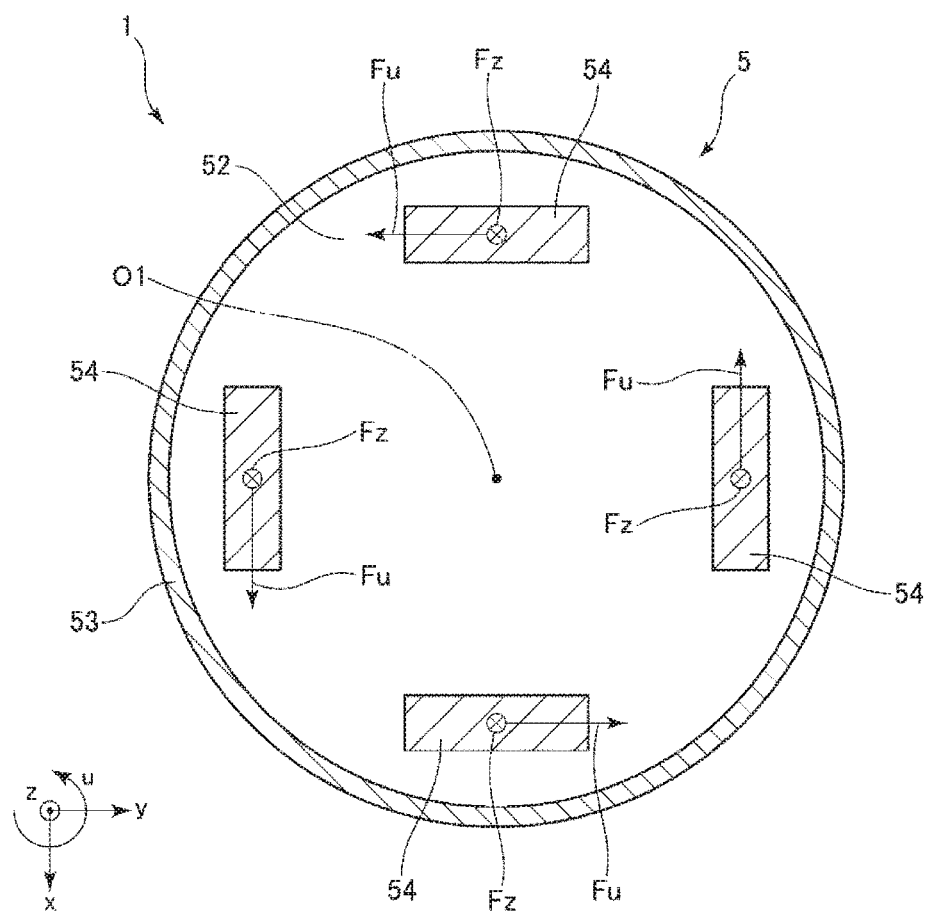
FIG. 4 is a sectional view along line A-A in FIG. 3.
Figure 5:
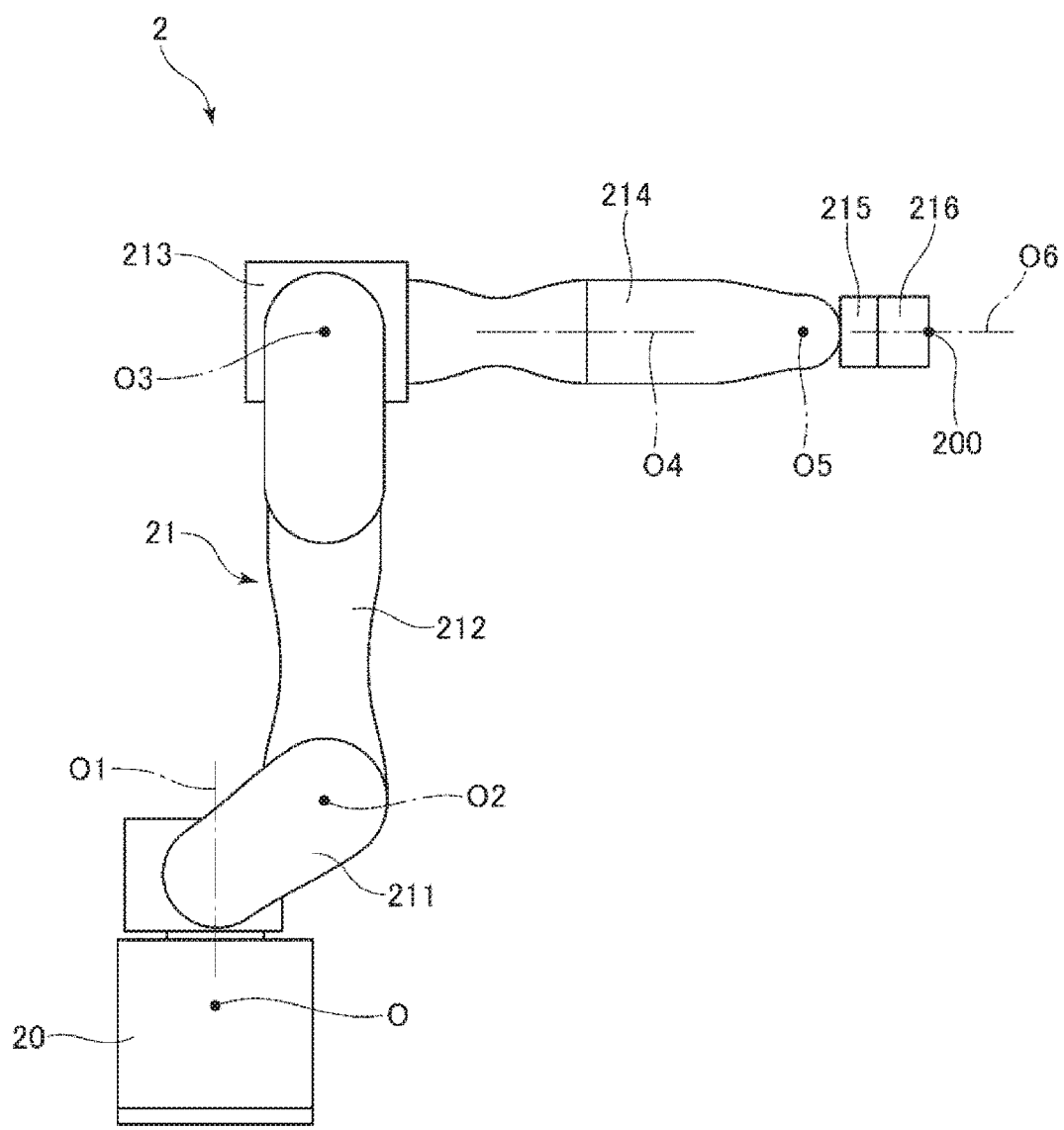
FIG. 5 is a side view showing a singular posture specific to a robot shown in FIG. 1.
Figure 6:
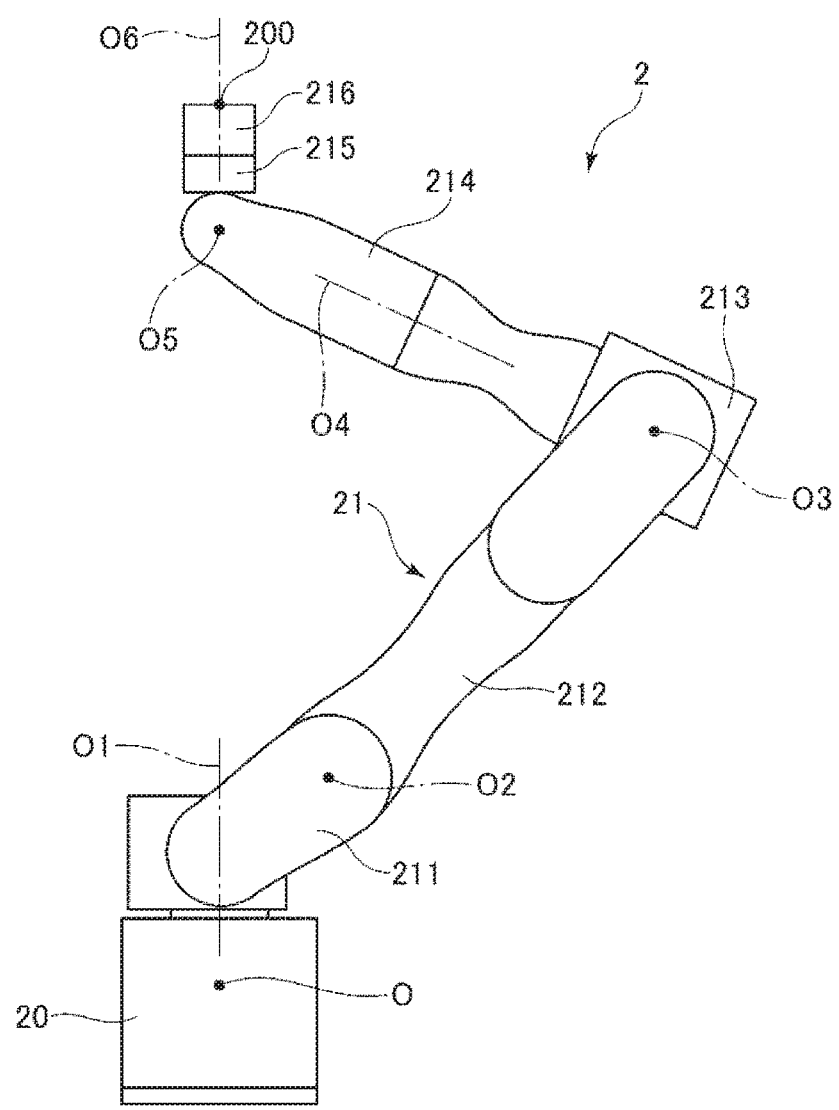
FIG. 6 is a side view showing a singular posture specific to the robot shown in FIG. 1.
Figure 7:
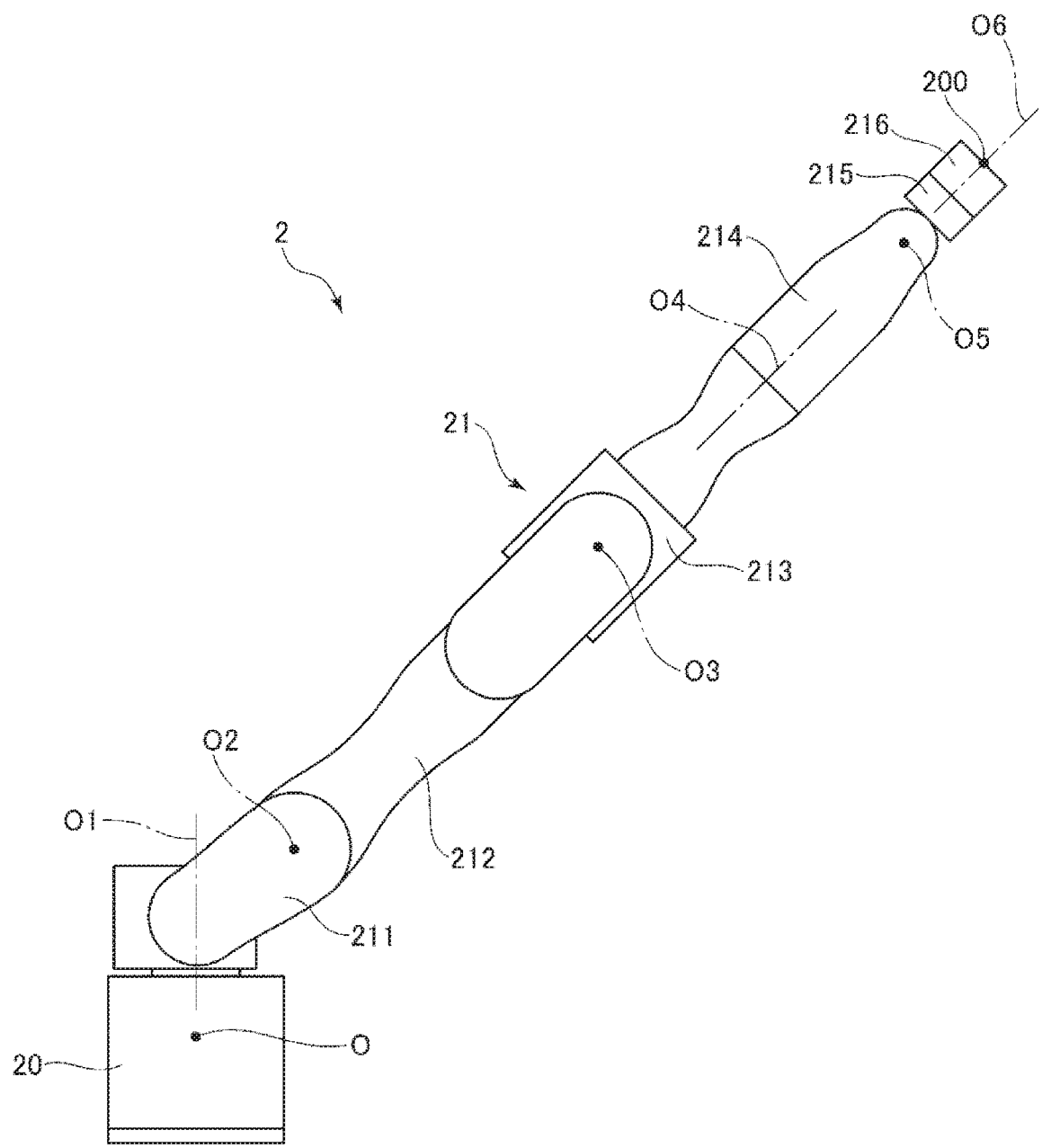
FIG. 7 is a side view showing a singular posture specific to the robot shown in FIG. 1.
Figure 8:
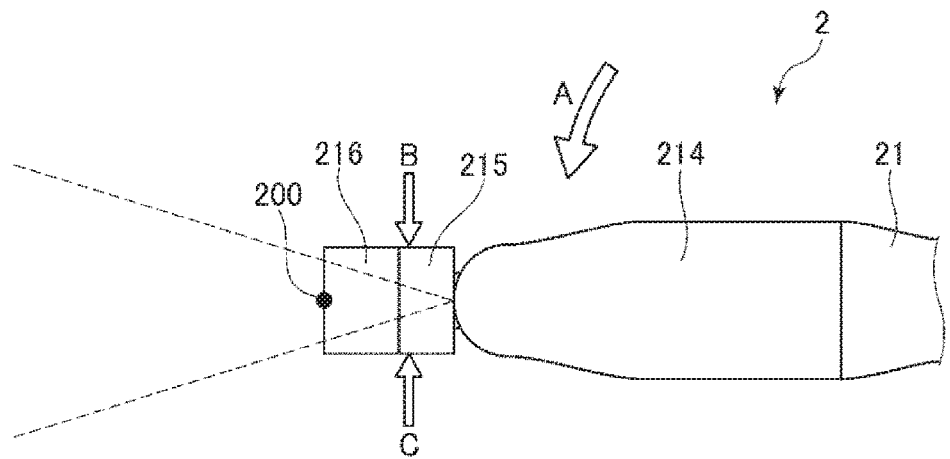
FIG. 8 is a side view for explanation of motion of a robot arm in a posture close to the singular posture of the robot shown in FIG. 1.
Figure 9:
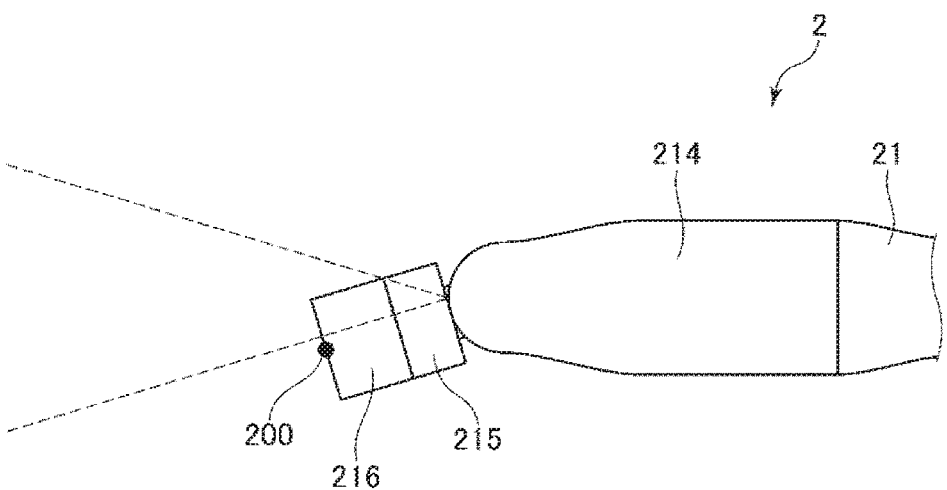
FIG. 9 is a side view for explanation of motion of the robot arm in the posture close to the singular posture of the robot shown in FIG. 1.
Figure 10:
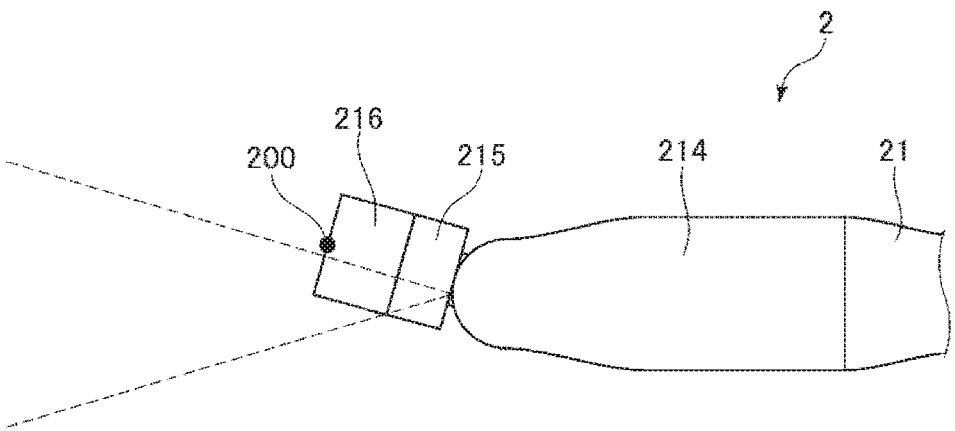
FIG. 10 is a side view for explanation of motion of the robot arm in the posture close to the singular posture of the robot shown in FIG. 1.
Figure 11:
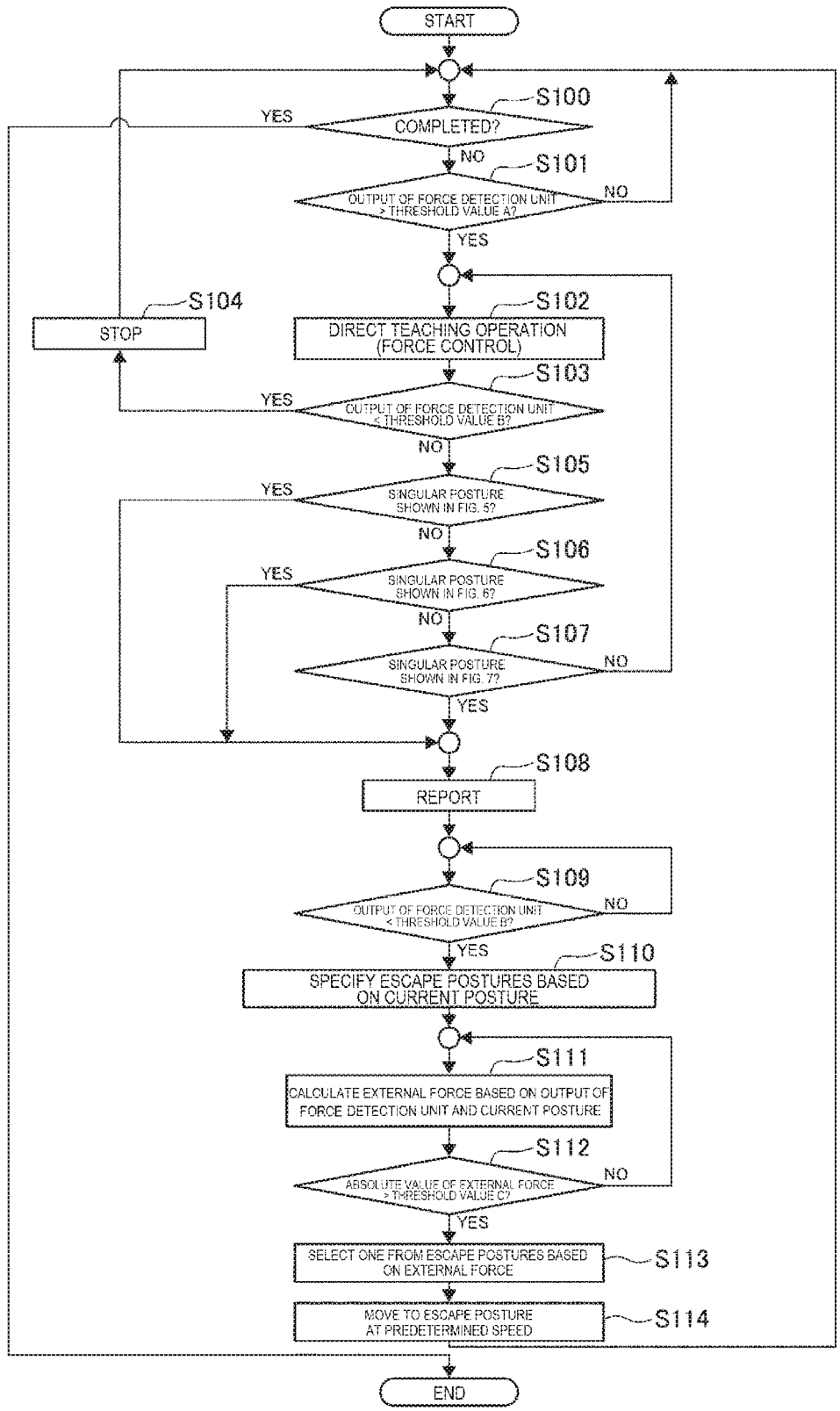
FIG. 11 is a flowchart for explanation of a control operation performed by a control apparatus of the robot system shown in FIG. 1.

FIG. 1 is the overall view showing a robot system that executes the teaching method according to the present disclosure. FIG. 2 is the block diagram of the robot system shown in FIG. 1. FIG. 3 is the longitudinal sectional view of the force detection unit of the robot system shown in FIG. 1. FIG. 4 is the sectional view along line A-A in FIG. 3. FIGS. 5 to 7 are the side views showing the singular postures specific to the robot shown in FIG. 1. FIGS. 8 to 10 are the side views for explanation of the motion of the robot arm in the postures close to the singular postures of the robot shown in FIG. 1. FIG. 11 is the flowchart for explanation of the control operation performed by the control apparatus of the robot system shown in FIG. 1. FIGS. 12 to 17 are the side views showing the singular postures specific to the robots of the modified examples.

A robot system 1 shown in FIG. 1 may perform work of e.g. feeding, removal, transport, assembly, etc. of precision apparatuses and components forming the apparatuses. The robot system 1 includes a robot 2 that executes predetermined work and a control apparatus 8 that controls driving of the robot 2.

The robot 2 is a six-axis robot. The robot 2 has a base 20 fixed to a floor, wall, ceiling, or the like, a robot arm 21, an end effector 22 attached to the distal end of the robot arm 21, and a force sensor 23 as a sensor attached between the robot arm 21 and the end effector 22.

The robot arm 21 has an arm 211 rotatably coupled to the base 20, an arm 212 rotatably coupled to the arm 211, an arm 213 rotatably coupled to the arm 212, an arm 214 rotatably coupled to the arm 213, an arm 215 rotatably coupled to the arm 214, and an arm 216 rotatably coupled to the arm 215.

The arm 211 rotates about a first axis O1, the arm 212 rotates about a second axis O2, the arm 213 rotates about a third axis O3, the arm 214 rotates about a fourth axis O4, the arm 215 rotates about a fifth axis O5, and the arm 216 rotates about a sixth axis O6. In the embodiment, the first axis O1 is parallel to a z-axis.

In the embodiment, a control point 200 is set in a position at the distal end of the arm 216 at an intersection with the sixth axis O6. Further, in the embodiment, an origin O of a robot coordinate system is set in the base 20. The origin O is set in a position overlapping with the first axis O1.

The end effector 22 is attached to the arm 216 via the force sensor 23. The force sensor 23 is attached to the robot arm 21, and thereby, contact with an object may be detected based on the output of the force sensor 23. Note that the configuration of the force sensor 23 is not particularly limited. For example, a sensor having a configuration using quartz crystal and utilizing the piezoelectric effect of the quartz crystal may be employed. The sensor is not particularly limited as long as the sensor may detect the contact with the object. For example, a contactless sensor, ultrasonic sensor, infrared sensor, range sensor, vision sensor, or the like may be used.

The robot 2 has a drive device 251 that rotates the arm 211 relative to the base 20, a drive device 252 that rotates the arm 212 relative to the arm 211, a drive device 253 that rotates the arm 213 relative to the arm 212, a drive device 254 that rotates the arm 214 relative to the arm 213, a drive device 255 that rotates the arm 215 relative to the arm 214, and a drive device 256 that rotates the arm 216 relative to the arm 215.

The drive device 251 has a motor M1 as a drive source, an encoder E1 as an angle detection unit that detects the amount of rotation of the motor M1, i.e., the rotation angle of the arm 211, an electromagnetic brake B1 that stops the actuation of the motor M1, and a reducer (not shown).

The drive device 252 has a motor M2 as a drive source, an encoder E2 as an angle detection unit that detects the amount of rotation of the motor M2, i.e., the rotation angle of the arm 212, an electromagnetic brake B2 that stops the actuation of the motor M2, and a reducer (not shown).

The drive device 253 has a motor M3 as a drive source, an encoder E3 as an angle detection unit that detects the amount of rotation of the motor M3, i.e., the rotation angle of the arm 213, an electromagnetic brake B3 that stops the actuation of the motor M3, and a reducer (not shown).

The drive device 254 has a motor M4 as a drive source, an encoder E4 as an angle detection unit that detects the amount of rotation of the motor M4, i.e., the rotation angle of the arm 214, an electromagnetic brake B4 that stops the actuation of the motor M4, and a reducer (not shown).

The drive device 255 has a motor M5 as a drive source, an encoder E5 as an angle detection unit that detects the amount of rotation of the motor M5, i.e., the rotation angle of the arm 215, an electromagnetic brake B5 that stops the actuation of the motor M5, and a reducer (not shown).

The drive device 256 has a motor M6 as a drive source, an encoder E6 as an angle detection unit that detects the amount of rotation of the motor M6, i.e., the rotation angle of the arm 216, an electromagnetic brake B6 that stops the actuation of the motor M6, and a reducer (not shown).

These drive device 251 to drive device 256 and the electromagnetic brake B1 to electromagnetic brake B6 are respectively independently controlled by the control apparatus 8.

Note that the configuration of the robot 2 is not particularly limited. For example, the number of arms may be one to five, seven, or more. Further, for example, the robot 2 may be a scalar robot, dual-arm robot, or the like.

Next, a force sensor 5 will be explained.

As shown in FIGS. 1 and 3, the force sensor 5 detects the force applied to the robot 2, i.e., the force applied to the robot arm 21 and the base 20. The force sensor 5 is provided in the lower part of the base 20 at the −z-axis side, supports the base 20 from the downside, and is also called a base force sensor.

Further, as shown in FIGS. 3 and 4, the force sensor 5 is a member having a first plate 51, a second plate 52, a tubular portion 53 placed between the first plate 51 and the second plate 52, a plurality of, in the embodiment, four elements 54, and a columnar outer shape. Further, the four elements 54 are sandwiched between the first plate 51 and the second plate 52. The number of the elements 54 is not limited to that, but may be three or less, five, or more.

The first plate 51 and the second plate 52 have circular plate shapes and placed apart sequentially from the +z-axis side. Note that the shapes of the first plate and the second plate 52 in the plan view may be any shapes, not limited to the circular shapes.

In the embodiment, the tubular portion 53 has a cylinder shape and a function of protecting the elements 54.

The respective elements 54 are placed to form a circular shape at equal intervals. Thereby, the forces applied to the respective elements 54 are as uniform as possible and the forces may be accurately detected.

As each element 54, e.g. an element formed using a piezoelectric material such as quartz crystal and outputting electric charge when subjected to an external force may be used. The control apparatus 8 may convert the external force applied to the robot arm 21 into a signal according to the amounts of electric charge. Further, such a piezoelectric material can adjust the direction in which the electric charge may be generated when the material is subjected to the external force according to the direction in which the material is placed.

In the embodiment, as shown in FIG. 4, each element 54 may detect a force Fz as a component in the vertical direction and a force Fu about the z-axis, i.e., in the u-axis direction. Thereby, the external force applied to the robot arm 21 may be accurately detected.

Next, the control apparatus 8 will be explained.

As shown in FIG. 2, the control apparatus 8 has a function of controlling driving of the robot 2 and is communicably coupled to the robot 2. Note that the communication between the robot 2 and the control apparatus 8 may be respectively made by wired connection or wireless connection. In the illustrated configuration, the control apparatus 8 is placed in a position different from that of the robot 2, i.e., in a position at a distance, however, may be provided inside of the robot 2.

As shown in FIG. 2, the control apparatus 8 includes a processor 81, a memory unit 82, and an receiving unit 83 having an external interface (I/F). The respective component elements of the control apparatus 8 are coupled communicably with one another via various buses.

The processor 81 controls the driving of the robot 2, i.e., the driving of the robot arm 21 etc. The processor 81 executes various programs stored in the memory unit 82.

Specifically, for example, the processor 81 may estimate the position in which the force is applied to the robot arm 21 and the magnitude of the force based on the magnitude and the directions of the forces detected by the respective elements 54 of the force sensor 5 and the position relationship between the origin O of the robot coordinates and the control point 200. The calibration curve and the arithmetic expression used for the estimation are stored in the memory unit 82.

Further, the processor 81 has a function of displaying various screens such as windows, characters, etc. on a display device 41.

Furthermore, the processor 81 executes a program on teaching, which will be described later. In this regard, the processor 81 functions as a determination unit that makes a determination as to whether or not the posture of the robot arm 21 is close to the singular posture, which will be described later.

In the memory unit 82, various programs that can be executed by the processor 81 and reference data, threshold values, calibration curves, etc. used for the control operation are stored. Note that the various programs contain the program for execution of the teaching method according to the present disclosure. Further, in the memory unit 82, various kinds of data received by the receiving unit 83 can be stored. The memory unit 82 includes e.g. a volatile memory such as a RAM (Random Access Memory), non-volatile memory such as a ROM (Read Only Memory), etc. Note that the memory unit 82 is not limited to the undetachable type but may have a detachable external memory device. Or, the memory unit 82 may be placed in another location via a network such as a LAN (Local Area Network).

As will be described later, in the memory unit 82, encoder values of singular postures, ranges of encoder values of postures close to the singular postures, ranges of encoder values of escape postures candidates, coordinates of the control point 200 in the singular postures in the robot coordinate system, coordinates of the control point 200 in the postures close to the singular postures in the robot coordinate system, coordinates of the control point 200 of the escape postures candidates in the robot coordinate system, etc. are stored.

The receiving unit 83 includes the external interface (I/F) and is used for respective couplings of the robot 2, the display device 41, an input device 42, etc. The receiving unit 83 functions as an acquisition unit of receiving, i.e., acquiring a teaching signal from the input device 42. Here, "teaching signal" refers to a signal transmitted from the input device 42 when the input device 42 is operated, i.e., a timing signal. A teacher operates the input device 42 at an arbitrary time and the position and the posture of the robot arm 21 when the receiving unit 83 acquires the signal from the input device 42 are stored as teaching information in the memory unit 82, and thereby, teaching is performed.

Note that "position" of "the position and the posture of the robot arm 21" refers to coordinates of the control point 200 of the robot arm 21 in the robot coordinate system and "posture" refers to postures of the arm 211 to arm 216, i.e., the posture of the robot arm 21. The control apparatus 8 may recognize the posture of the robot arm 21 based on the output results from the encoder E1 to encoder E6, i.e., the encoder values. Further, the apparatus may specify the coordinates of the control point 200 of the robot arm 21 in the robot coordinate system from the posture of the robot arm 21. In the memory unit 82, the calibration curve indicating the relationship is stored.

When the receiving unit 83 acquires the teaching signal, the processor 81 specifies the position of the control point 200 at the time based on the detection results of the encoder E1 to encoder E6 and the calibration curve, and specifies the position, i.e., the coordinates as a taught point. The information of the taught point is stored in the memory unit 82 and used for work performed by the robot 2.

Note that another configuration may be added to the control apparatus 8 in addition to the above described configuration. The various programs, data, etc. stored in the memory unit 82 may be the one stored in the memory unit 82 in advance, the one stored in e.g. a recording medium such as a CD-ROM and provided from the recording medium, or the one provided via a network or the like.

The display device 41 includes a monitor (not shown) of e.g. a liquid crystal display, organic EL display, or the like, and has a function of displaying various images, characters, etc. including various screens such as windows. Further, the display device 41 also functions as a reporting unit that reports that the posture of the robot arm 21 is close to the singular posture as will be described later.

The input device 42 includes e.g. a mouse, keyboard, mobile terminal, teaching pendant, etc. Therefore, the user operates the input device 42, and thereby, may give instructions of various kinds of processing etc. to the control apparatus 8. Further, the input device 42 has a teaching start button, a teaching end button, etc. (not shown).

Note that, in the embodiment, in place of the display device 41 and the input device 42, a display input device serving as both the display device 41 and the input device 42 may be provided. As the display input device, e.g. a touch panel such as an electrostatic touch panel or pressure-sensitive touch panel may be used. Or, the input device 42 may recognize sound including voice.

Or, at least one of the display device 41 and the input device 42 may be provided in the robot 2, e.g. the base 20.

As above, the configuration of the robot system 1 is explained.

In the robot system 1, prior to the work by the robot 2, teaching of storing the position and the posture of the robot arm 21 in the memory unit 82 is performed. The system of the teaching method according to the present disclosure is direct teaching by the operator performing teaching by really pushing and pulling the robot arm 21. In the direct teaching, the operator moves the robot arm 21 by really applying a force thereto in the desirable path in the work performed by the robot arm 21 and the memory unit 82 stores the path.

Specifically, for example, when the operator pushes a predetermined part of the robot arm 21, an external force is applied to the robot 2 and a force is indirectly applied to the force sensor 5. The processor 81 estimates the magnitude and the direction of the force applied to the robot arm 21 based on that force. Then, the processor 81 drives the drive device 251 to drive device 256 based on the estimation result, the robot arm 21 moves and is displaced in the direction in which the operator desired to move the robot arm 21, and the position and the posture of the robot arm 21 are changed. This operation is performed until the control point 200 moves to a target position, and the positions and the postures are sequentially stored in the memory unit 82 at predetermined times.

During execution of the direct teaching, the robot arm 21 may be located close to the singular posture. The singular posture refers to a posture in which it is impossible to uniquely specify the postures of the respective arm 211 to arm 216 based on the coordinates of the control point 200 as reference of control or a posture in which there is a direction in which it is impossible to change the position and the posture of the control point 200.

During the direct teaching, when the posture of the robot is close to the singular posture, it is hard to change the posture and there is an arm moving at a higher speed, and the motion tends to be unstable. In the robot system 1, the failures may be prevented or suppressed in the following manner.

The processor 81 switches between a normal teaching mode and a close-to-singular posture mode according to the posture of the robot arm 21. In the normal teaching mode, whether or not the posture of the robot arm 21 is close to the singular posture is determined while the above described direct teaching is executed.

The singular posture of the robot arm 21 is the posture specific to the robot 2, i.e., the robot arm 21, and there are three patterns shown in FIGS. 5 to 7 in the illustrated configuration. The singular posture shown in FIG. 5 is a posture in which the fourth axis O4 and the sixth axis O6 are located in the same straight line. The singular posture shown in FIG. 6 is a posture in which the intersection of the fifth axis O5 and the sixth axis O6 is located in the straight line of the first axis O1. The singular posture shown in FIG. 7 is a posture in which the straight line orthogonal to the second axis O2 and the third axis O3 and the straight line orthogonal to the third axis O3 and the fifth axis O5 are located in the same straight line.

These singular postures are stored in the memory unit 82. Specifically, the singular posture shown in FIG. 5 is stored as an encoder value (E5α) of the encoder E5 in the memory unit 82.

The singular posture shown in FIG. 6 is stored as coordinates (X1β, Y1β) of the control point 200 in the robot coordinate system in the memory unit 82.

The singular posture shown in FIG. 7 is stored as an encoder value (E3γ) of the encoder E3 in the memory unit 82.

In the normal teaching mode, the processor 81 detects the encoder values of the respective encoders E1 to E6 and determines whether or not the posture of the robot arm 21 is close to the singular posture. The posture close to the singular posture is respectively set for each of the singular postures as below.

The posture close to the singular posture shown in FIG. 5 is a posture in which the angle formed by the fourth axis O4 and the sixth axis O6 is within ±2 degrees. The posture close to the singular posture shown in FIG. 6 is a posture in which the intersection of the fifth axis O5 and the sixth axis O6 is located within a cylinder having a radius of 10 mm around the first axis O1. The posture close to the singular posture shown in FIG. 7 is a posture in which the angle formed by the straight line orthogonal to the second axis O2 and the third axis O3 and the straight line orthogonal to the third axis O3 and the fifth axis O5 is within ±2 degrees.

Further, the posture close to the singular posture shown in FIG. 5 is an encoder value range in which a predetermined numerical range is set for the encoder values and stored in the memory unit 82 in advance. Specifically, the posture is stored as the encoder value range (E5α±k) in the memory unit 82.

The posture close to the singular posture shown in FIG. 6 is a coordinate range of the control point in the robot coordinate system in which a predetermined numerical range is set for the coordinates of the control point in the robot coordinate system and stored in the memory unit 82 in advance. Specifically, the posture is stored as the coordinate range ((X1β±k,Y1β±k)) of the control point 200 in the robot coordinate system in the memory unit 82.

The posture close to the singular posture shown in FIG. 7 is an encoder value range in which a predetermined numerical range is set for the encoder values and stored in the memory unit 82 in advance. Specifically, the posture is stored as the encoder value range (E3γ±k) in the memory unit 82.

Note that the above described k may be different numerical values from one another.

The processor 81 determines whether or not the encoder value of the encoder E5 corresponds to (E5α±k), whether or not the coordinates of the control point 200 in the robot coordinate system correspond to ((X1β±k,Y1β±k)), and whether or not the encoder value of the encoder E3 corresponds to (E3γ±k).

As described above, the robot system 100 includes the encoders E1 to E6 as the angle detection units that detect the rotation angles of the arm 211 to arm 216. The system determines whether or not the posture is close to the singular posture based on whether or not the detection result of the encoder E5 or the encoder E3 falls within a predetermined range or whether or not the position of the control point 200 obtained from the detection results of the respective encoders E1 to E6 falls within a predetermined range. Thereby, the determination may be performed more accurately.

Then, when the encoder value of the encoder E5 corresponds to (E5α±k), the coordinates of the control point 200 in the robot coordinate system correspond to ((X1β±k, Y1β±k)), or the encoder value of the encoder E3 corresponds to (E3γ±k), the processor 81 switches from the normal teaching mode to the close-to-singular posture mode.

The processor 81 selects one escape posture candidate from a plurality of escape posture candidates in the close-to-singular posture mode.

For example, when the posture close to the singular posture as shown in FIG. 5 is determined, that is, when the detected encoder value of the encoder E5 is within the range of (E5=±k), one escape posture is selected from the plurality of escape posture candidates.

The escape posture refers to a posture out of the range close to the singular posture. For the escape posture, a plurality of encoder values out of the range of (E5α±k) are stored in the memory unit 82 in advance. The respective stored encoder value candidates are the escape posture candidates.

A plurality of escape postures are set in the singular posture shown in FIG. 6. Specifically, a plurality of the robot coordinates of the control point out of the range of ((X1β±k, Y1β±k)) are stored in the memory unit 82 in advance.

A plurality of escape postures are set in the singular posture shown in FIG. 7. Specifically, a plurality of encoder values out of the range of (E3γ±k) are stored in the memory unit 82 in advance.

As described above, in the memory unit 82, at least one singular posture specific to the robot 2 and a plurality of escape postures corresponding to the singular posture are stored. Thereby, when a determination, which will be described later, is performed, a step of calculating the escape posture may be omitted and the determination to be described later may be performed more easily.

The processor 81 selects one escape posture from the escape posture candidates according to the detection result of the force sensor 5. As below, as shown in FIG. 8, a case where the robot arm 21 is moved from a direction of an arrow A into a posture close to the singular posture will be explained as an example. In FIGS. 8 to 10, the postures in which the sixth axis O6 is located within the range shown by broken lines are close to the singular posture.

The escape posture refers to another posture than the postures close to the singular posture of the postures that can be taken by the robot arm 21.

As shown in FIG. 8, when the posture of the robot arm is close to the singular posture, the processor 81 stops the robot arm 21. Then, under the condition, an external force is detected by the force sensor 5.

For example, when the operator applies a force to the arm 216 from a direction of an arrow B in FIG. 8, the processor 81 specifies the direction of the external force applied to the robot arm 21 based on the detection result of the force sensor 5. Then, as shown in FIG. 9, the processor 81 selects the escape posture in which the control point 200 is located forward in the arrow B direction from the plurality of escape postures.

Or, when the operator applies a force to the arm 216 from a direction of an arrow C in FIG. 8, the processor 81 specifies the direction of the external force applied to the robot arm 21 based on the detection result of the force sensor 5. As shown in FIG. 10, the processor 81 selects the escape posture in which the control point 200 is located forward in the arrow C direction of the plurality of escape postures.

As described above, the processor 81 selects the escape posture located forward in the direction of the external force applied by the operator. That is, the processor 81 makes a selection with the external force applied by the operator as a trigger. Note that, when a plurality of escape posture candidates are present forward in the direction of the external force when the escape posture is selected, the processor 81 selects the single escape posture by selecting the posture in which the movement distance of the control point 200 minimum or the posture in which the total of the amounts of rotation of the arm 211 to arm 216 is the minimum.

Then, the processor 81 executes the selected escape posture. That is, the processor 81 drives the drive device 251 to drive device 256 at predetermined speeds to rotate the arms 211 to 216 so that the posture of the robot arm 21 may be the selected escape posture.

As described above, in the robot system 1, the operator may set the robot arm 21 to the escape posture by the simple operation of performing a trigger operation to order the escape posture. That is, it is not necessary for the operator to perform teaching by continuously applying a force to the robot arm 21 for escape from the posture close to the singular posture. Thereby, the escape posture may be stably set by the simple method.

Note that the trigger operation performed by the operator is not limited to the above described two patterns. Specifically, when the robot arm 21 is seen from the direction of the sixth axis O6, the external force may be applied from a direction crossing the arrow B direction and the arrow C direction, not limiting from the arrow B direction or the arrow C direction. Also, in this case, the direction of the applied external force may be specified and the escape posture in which the control point 200 is located forward in the direction may be selected. That is, the trigger operation may be three-dimensional.

Or, the magnitude of the external force in the trigger operation may be detected and the speed of the movement into the escape posture may be determined based on the detected magnitude of the external force.

Next, the teaching method according to the present disclosure will be explained based on the flowchart shown in FIG. 11. As below, the explanation will be started from a condition that the operator operates e.g. the input device 42 to start the normal teaching mode and the operator applies the external force to the robot arm 21 by pushing and pulling the predetermined parts of the robot arm 21.

First, at step S100, whether or not teaching is completed is determined. For example, the determination is made based on whether or not the operator operated the end button of the input device 42. Note that, at step S100, when the determination that the teaching is not completed is made, the process moves to step S101.

Then, at step S101, whether or not the detection result, i.e., the output of the force sensor 5 as the force detection unit exceeds a threshold value A is determined. The threshold value A is a value indicating the magnitude of the force and a determination criterion for the determination as to whether or not the operator applies the external force to the robot arm 21. The threshold value A is a preset value and stored in the memory unit 82.

At step S101, when the determination that the detection result of the force sensor 5 exceeds the threshold value A is made, at step S102, direct teaching operation is performed. That is, the drive device 251 to drive device 256 are driven according to the detection result of the force sensor 5 and the robot arm 21 is moved.

Then, at step S103, whether or not the detection result, i.e., the output of the force sensor 5 as the force detection unit is smaller than a threshold value B is determined. Note that the threshold value B is a value indicating the magnitude of the force and a determination criterion for the determination as to whether or not the operator stops the application of the external force to the robot arm 21. The threshold value B is a preset value and stored in the memory unit 82.

At step S103, when the determination that the detection result of the force sensor 5 is smaller than the threshold value B is made, at step S104, the robot arm 21 is stopped and the process returns to the above described step S100.

At step S103, when the determination that the detection result of the force sensor 5 is equal to or larger than the threshold value B is made, the process moves to step S105. At step S105, whether or not the current posture of the robot arm 21 is close to the singular posture shown in FIG. 5 is determined. That is, whether or not the encoder values detected in the posture of the robot arm 21 correspond to (E5α±k) is determined.

At step S105, when the determination that the posture is the singular posture shown in FIG. 5 is made, the process moves to step S108, which will be described later. At step S105, when the determination that the posture is not the singular posture shown in FIG. 5 is made, the process moves to step S106.

At step S106, whether or not the current posture of the robot arm 21 is close to the singular posture shown in FIG. 6 is determined. That is, whether or not the robot coordinates of the control point in the current posture of the robot arm 21 correspond to ((X1β±k,Y1β±k)) is determined.

At step S106, when the determination that the posture is the singular posture shown in FIG. 6 is made, the process moves to step S108 to be described later. At step S106, when the determination that the posture is not the singular posture shown in FIG. 6 is made, the process moves to step S107.

At step S107, whether or not the current posture of the robot arm 21 is close to the singular posture shown in FIG. 7 is determined. That is, whether or not the respective encoder values detected in the posture of the robot arm 21 correspond to (E3γ±k) is determined.

At step S107, when the determination that the posture is not the singular posture shown in FIG. 7 is made, the process moves to step S102. At step S107, when the determination that the posture is the singular posture shown in FIG. 7 is made, the process moves to step S108.

At step S108, the robot arm 21 is stopped. That is, the target position of the control point 200 is set to the stop position so that the robot arm 21 may be stationary.

Further, at step S108, it is reported that the posture of the robot arm 21 is close to the singular posture using the display device 41. This report is made by e.g. display of "close to singular posture" on the display device 41. Note that the report is not only by display but also by sound or vibration including a simple blinking pattern of a lamp and a combination of two or more of those.

As described above, the robot system 1 includes the display device 41 as the reporting unit. Then, when the determination that the posture of the robot arm 21 is close to the singular posture is made, the processor 81 reports that the posture of the robot arm 21 is close to the singular posture by actuation of the display device 41 before displacement of the robot arm 21 to the escape posture. Thereby, forcible operation of the robot 21 by the operator without noticing that the posture of the robot arm 21 is close to the singular posture may be prevented or suppressed.

Then, at step S109, whether or not the detection result, i.e., the output of the force sensor 5 as the force detection unit is smaller than the threshold value B is determined. When the output is smaller than the threshold value B, at step S110, a plurality of escape posture candidates are specified based on the current posture of the robot arm 21. At step S110, as described above, on the basis of a combination of the ranges of the encoder values close to the corresponding singular posture or the ranges of the coordinates of the control point 200 in the robot coordinate system of the singular postures shown in FIGS. 5 to 7, a plurality of combinations of the encoder values not corresponding to the combination of the ranges of the encoder values are calculated and specified. That is, the robot waits in the stationary state until the operator once releases the hand. Thereby, the operator may accurately perform the trigger operation with relief. Further, the detection accuracy of the force in the trigger operation may be increased.

Then, at step S111, the magnitude and the direction of the external force applied by the operator are calculated based on the detection result of the force sensor 5 as the force detection unit and the current detection results of the encoder E1 to encoder E6.

Then, at step S112, whether or not the magnitude of the external force calculated at step S111 is larger than a threshold value C is determined. The threshold value C is a value as a determination criterion for determination as to whether or not the operator performed the trigger operation. The threshold value C is a preset value and stored in the memory unit 82.

At step S112, when the determination that the magnitude of the external force calculated at step S111 is equal to or smaller than the threshold value C is made, the process returns to step S111. Or, at step S112, when the determination that the magnitude of the external force calculated at step S111 is larger than the threshold value C is made, the process proceeds to step S113.

At step S113, one escape posture is selected from the plurality of escape postures based on the direction of the external force calculated at step S111. That is, as described above, when the escape posture is selected, the direction of the external force applied to the robot arm 21 is specified according to the direction of the force detected by the force sensor 5 as the force detection unit, and the escape posture in which the control point 200 moves forward in the specified direction is selected. Thereby, the operator may accurately select the escape posture by the simple method of applying the external force in the direction in which the movement of the robot arm 21 is desired.

Then, at step S114, the process is executed to set the escape posture selected at step S113. That is, the drive device 251 to drive device 256 are driven to move the arm 211 to arm 216 at predetermined speeds into the escape posture. Then, the process returns to step S100 and the subsequent steps are sequentially repeated.

As described above, the teaching method according to the present disclosure is the teaching method for the robot system 1 including the robot arm 21 having the arm 211 to arm 216 as at least one rotatable arm, the drive devices 251 to 256 that drive the robot arm 21, the force sensor 5 as the force detection unit that detects the external force applied to the robot arm 21, and the memory unit 82 that stores the position and the posture of the robot arm 21, of driving the robot arm 21 by the drive devices 251 to 256 based on the detection result of the force sensor 5 and storing the position and the posture of the driven robot arm 21 in the memory unit 82. Further, the teaching method according to the present disclosure includes determining whether or not the posture of the robot arm 21 is close to the singular posture and, when determining that the posture of the robot arm 21 is close to the singular posture, selecting and executing one escape posture from the plurality of escape posture candidates escaping from the posture close to the singular posture according to the external force detected by the force sensor 5.

According to the present disclosure, when the posture of the robot arm 21 is close to the singular posture, for example, the operator performs the trigger operation on the robot arm 21, and thereby, one escape posture may be selected from the plurality of escape posture candidates based thereon and executed. That is, it is not necessary for the operator to perform teaching by continuously applying the force to the robot arm 21 for escape of the robot arm 21 from the posture close to the singular posture. Thereby, the escape posture may be stably set by the simple method.

Further, as described above, when the determination that the posture of the robot arm 21 is close to the singular posture is made, the motion of the robot arm 21 is stopped and the external force is detected by the force sensor 5 as the force detection unit before the robot arm 21 is displaced to the escape posture. Thereby, with the robot arm 21 stopped, the operator may accurately perform the trigger operation with relief. Further, the detection accuracy of the force in the trigger operation may be increased.

As above, the teaching method according to the present disclosure is explained based on the illustrated preferred embodiment, however, the present disclosure is not limited to those. The configurations of the respective parts may be replaced by arbitrary configurations having the same functions. Further, another arbitrary configuration may be added.

Figure 14:
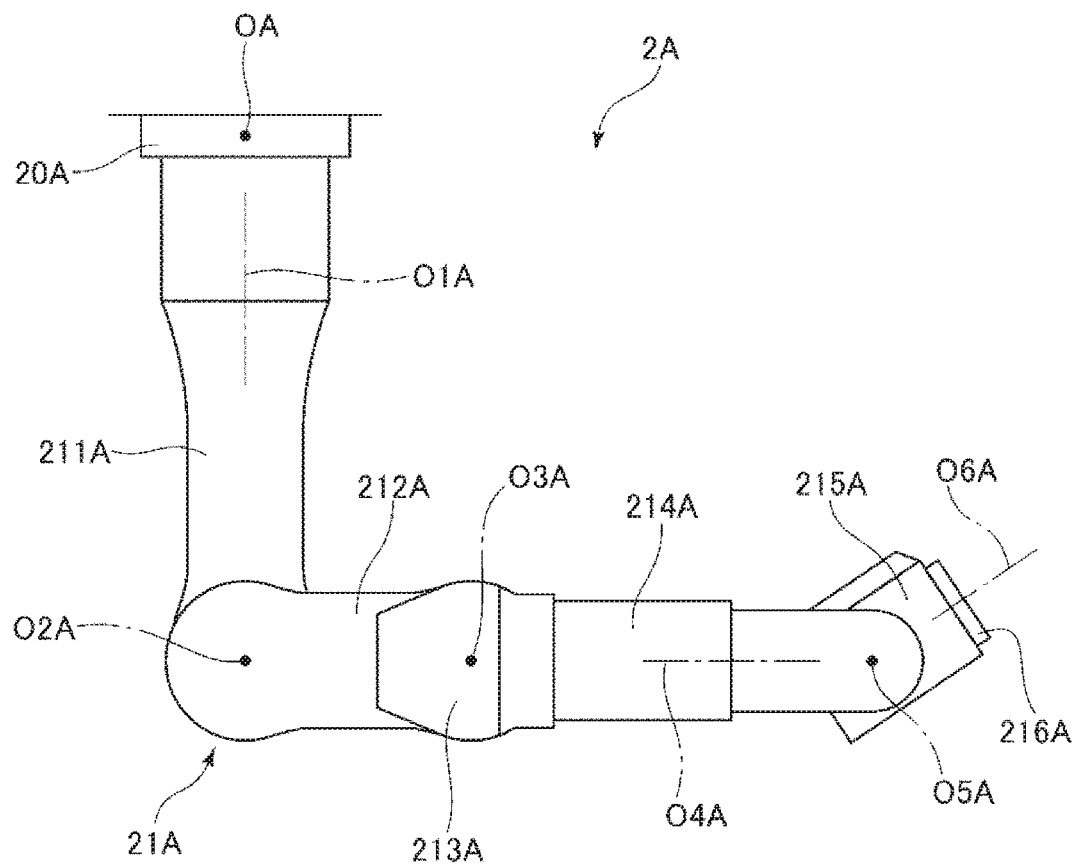
FIG. 14 is a side view showing a singular posture specific to the robot of the modified example.
Figure 15:
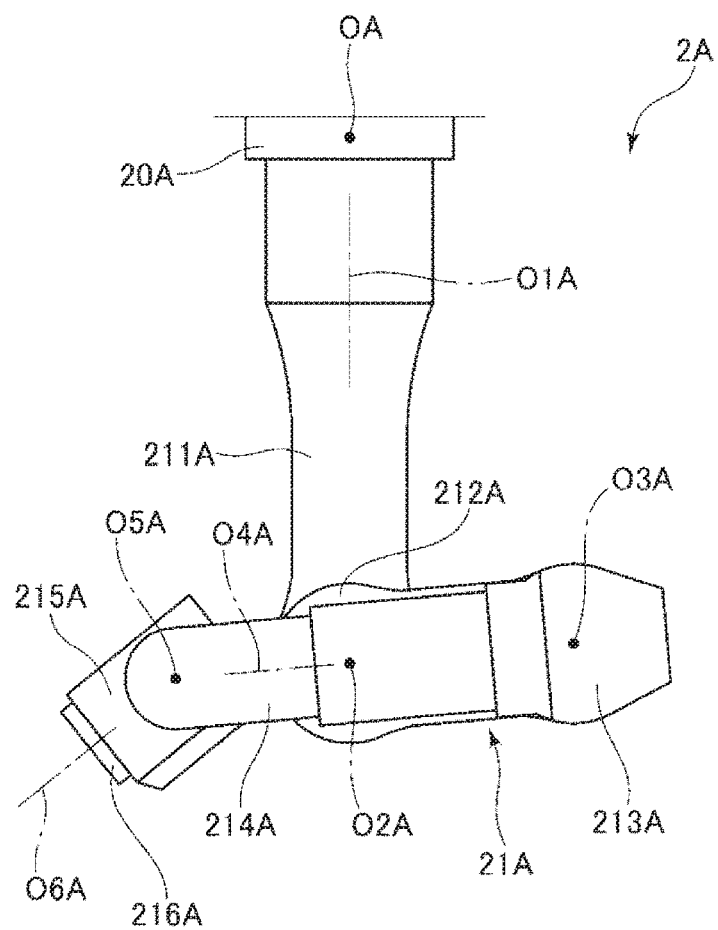
FIG. 15 is a side view showing the singular posture specific to the robot of the modified example.
Figure 16:
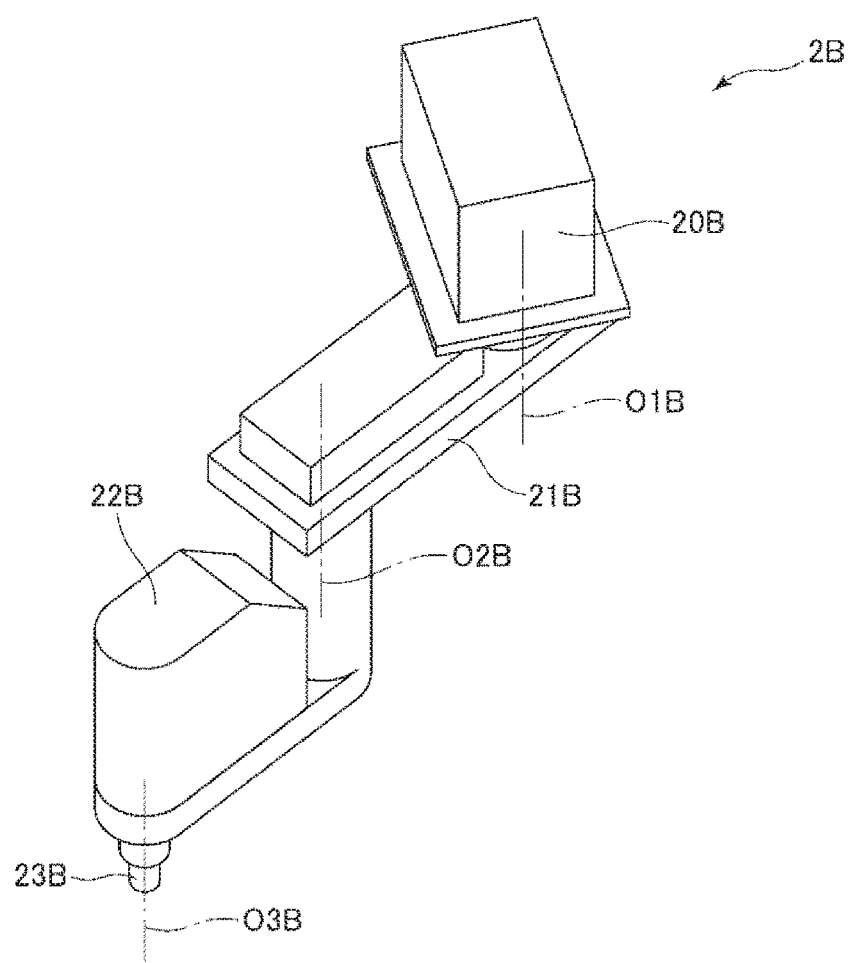
FIG. 16 is a side view showing a singular posture specific to a robot of a modified example.
Figure 17:
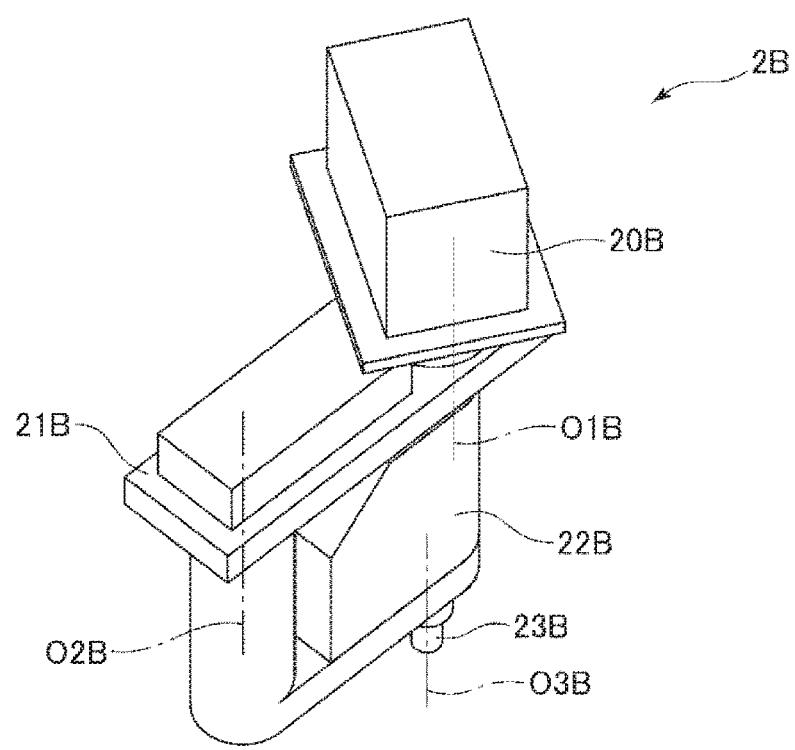
FIG. 17 is a side view showing the singular posture specific to the robot of the modified example.

In the above described embodiment, the six-axis robot as shown in FIG. 1 is explained as an example, however, the present disclosure may be applied to a robot 2A as shown in FIGS. 12 to 15 and a robot 2B as shown in FIGS. 16 and 17 in modified examples.

Modified Example 1

The robot 2A as shown in FIGS. 12 to 15 is a suspended vertical articulated robot. The robot 2A has a base 20A placed on the ceiling and a robot arm 21A coupled to the base 20A. Further, the robot arm 21A has an arm 211A rotatably coupled to the base 20A, an arm 212A rotatably coupled to the arm 211A, an arm 213A rotatably coupled to the arm 212A, an arm 214A rotatably coupled to the arm 213A, an arm 215A rotatably coupled to the arm 214A, and an arm 216A rotatably coupled to the arm 215A.

The arm 211A rotates about a first axis O1A, the arm 212A rotates about a second axis O2A, the arm 213A rotates about a third axis O3A, the arm 214A rotates about a fourth axis O4A, the arm 215A rotates about a fifth axis O5A, and the arm 216A rotates about a sixth axis O6A. In the embodiment, the first axis O1A is parallel to the vertical direction.

There are the following four singular postures specific to the robot 2A.

Figure 12:
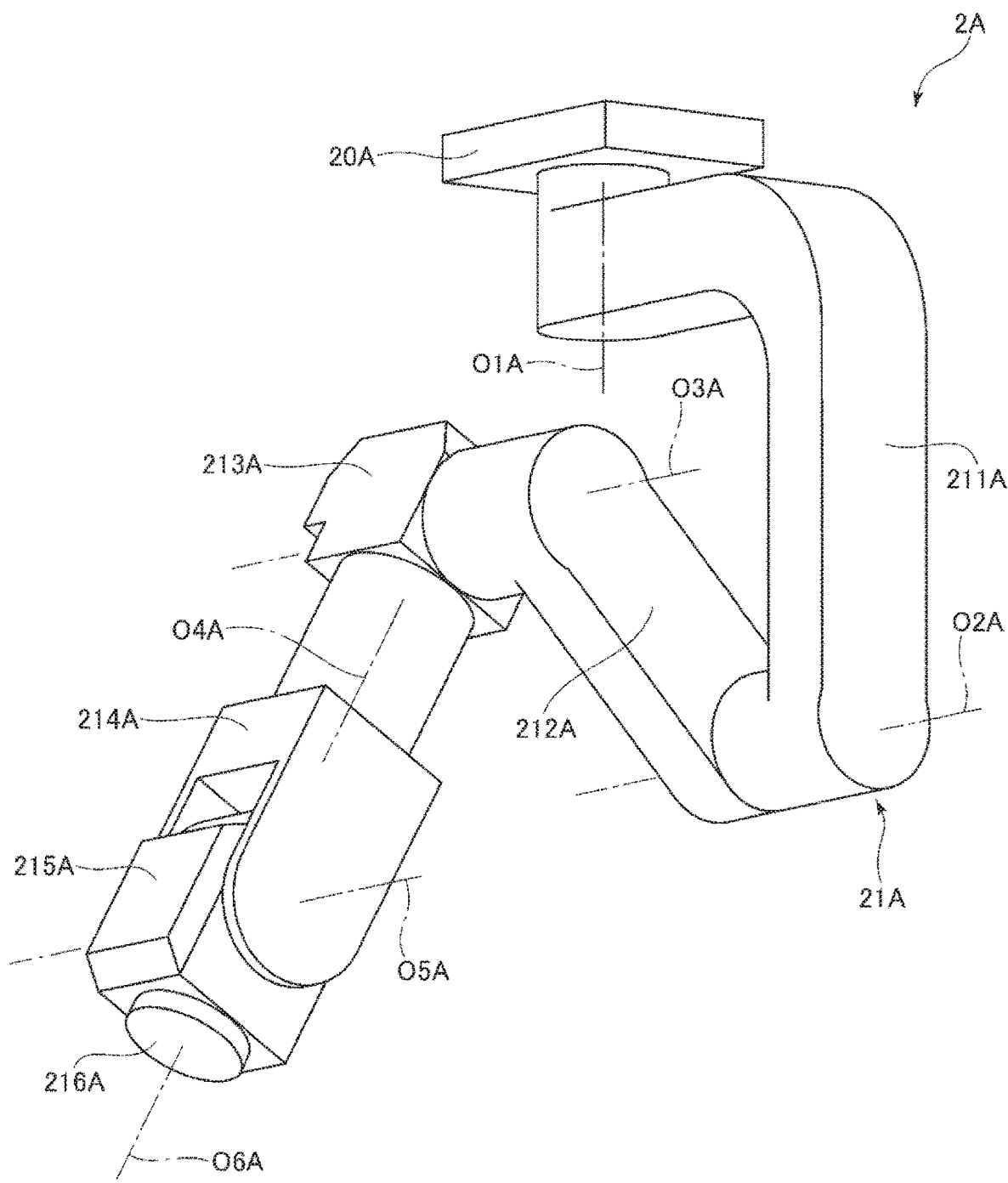
FIG. 12 is a side view showing a singular posture specific to a robot of a modified example.

The singular posture shown in FIG. 12 is a posture in which the fourth axis O4A and the sixth axis O6A are located in the same straight line. The posture close to the singular posture is a posture in which the angle formed by the fourth axis O4A and the sixth axis O6A is within ±2 degrees.

Figure 13:
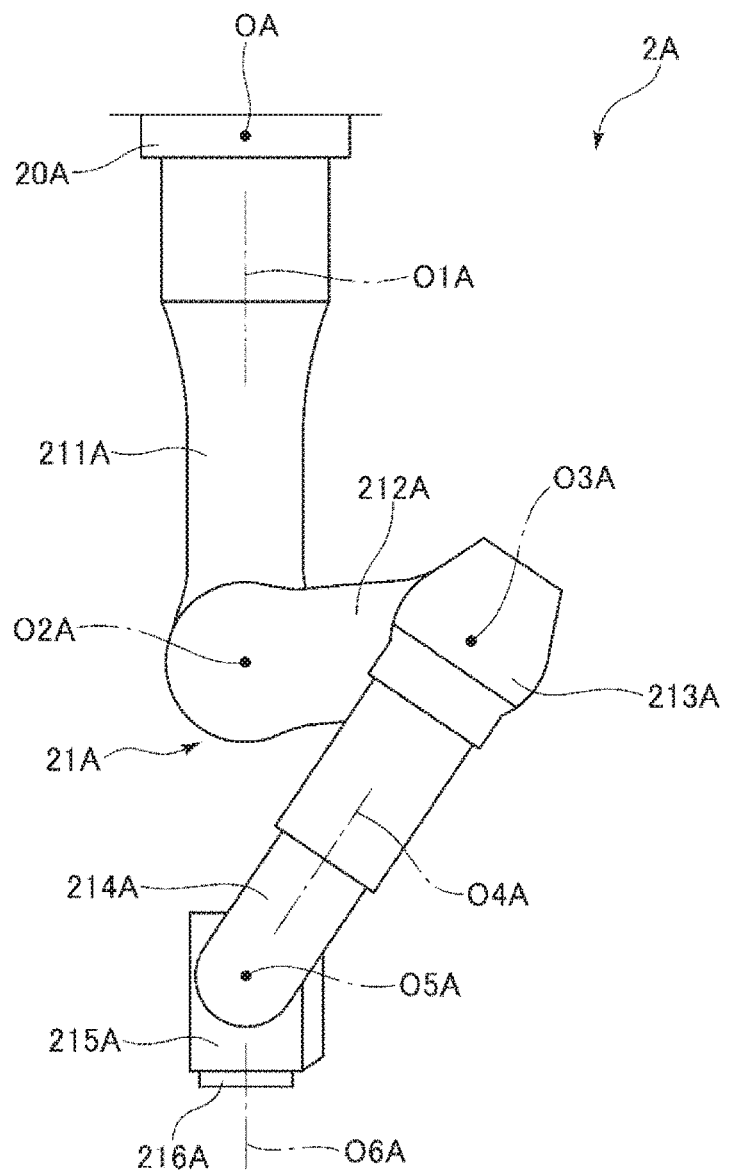
FIG. 13 is a side view showing a singular posture specific to the robot of the modified example.

The singular posture shown in FIG. 13 is a posture in which the intersection of the fifth axis O5A and the sixth axis O6A is located in the straight line of the first axis O1A. The posture close to the singular posture is a posture in which the intersection of the fifth axis O5A and the sixth axis O6A is located within a circle having a radius of 10 mm around an origin OA of the first axis O1A.

The singular postures shown in FIGS. 14 and 15 are postures in which a straight line orthogonal to the second axis O2A and the third axis O3A and a straight line orthogonal to the third axis O3A and the fifth axis O5A are located in the same straight line. The posture close to the singular postures is a posture in which the angle formed by the straight line orthogonal to the second axis O2A and the third axis O3A and the straight line orthogonal to the third axis O3A and the fifth axis O5A is within ±2 degrees.

Modified Example 2

The robot 2B shown in FIGS. 16 and 17 is a suspended horizontal articulated robot. The robot 2B has a base 20B placed on the ceiling, an arm 21B rotatable about a first axis O1B, an arm 22B coupled to the arm 21B and rotating about a second axis O2B parallel to the first axis O1B, and an arm 23B supported by the arm 22B, rotating about a third axis O3B parallel to the first axis O1B and the second axis O2B, and moving along the third axis O3B.

There are the following two singular postures specific to the robot 2B.

The singular postures shown in FIGS. 16 and 17 are postures in which a straight line orthogonal to the first axis O1B and the second axis O2B and a straight line orthogonal to the second axis O2B and the third axis O3B are located in the same straight line. The posture close to the singular postures is a posture in which the angle formed by the straight line orthogonal to the first axis O1B and the second axis O2B and the straight line orthogonal to the second axis O2B and the third axis O3B is within ±2 degrees.

The present disclosure can be also applied to the robots 2A, 2B shown in the modified example 1 and modified example 2.

What is claimed is:

1. A teaching method for a robot system including a robot arm having at least one rotatable arm, a drive unit that drives the robot arm, a force detection unit that detects an external force applied to the robot arm, and a memory unit that stores a position and a posture of the robot arm, of driving the robot arm by the drive unit based on a detection result of the force detection unit and storing the position and the posture of the driven robot arm in the memory unit, the teaching method comprising:
   determining whether or not the posture of the robot arm is close to a singular posture; and
   when determining that the posture of the robot arm is close to the singular posture, selecting and executing one escape posture from a plurality of escape posture candidates escaping from the posture close to the singular posture according to the external force detected by the force detection unit.

2. The teaching method according to claim 1, wherein the robot system includes an angle detection unit that detects a rotation angle of the arm, and
   the determination is made based on whether or not a detection result of the angle detection unit is within a predetermined range or a position of a control point obtained from the detection result is within a predetermined range.

3. The teaching method according to claim 1, wherein when the escape posture is selected, a direction of the external force applied to the robot arm is specified according to a direction of the force detected by the force detection unit and the escape posture in which a control point is moved forward in the specified direction is selected.

4. The teaching method according to claim 1, wherein when the determination that the posture of the robot arm is close to the singular posture is made, motion of the robot arm is stopped and the external force is detected by the force detection unit before the robot arm is displaced to the escape posture.

5. The teaching method according to claim 1, wherein the memory unit stores at least the single singular posture specific to the robot arm and a plurality of the escape postures corresponding to the singular posture.

6. The teaching method according to claim 1, wherein the robot system includes a reporting unit, and
   when the determination that the posture of the robot arm is close to the singular posture is made, the reporting unit is actuated and reports that the posture of the robot arm is close to the singular posture before the robot arm is displaced to the escape posture.

* * * * *